United States Patent
Hsiang

(10) Patent No.: US 7,036,752 B1
(45) Date of Patent: May 2, 2006

(54) CONNECTION OF CUP AND PAINT SPRAYER

(76) Inventor: Shin Kuei Hsiang, No. 1, Alley 16, Lang 40, Jinde Rd., East District, Taichung City 40141 (TW)

( * ) Notice: Subject to any disclaimer, the term of this patent is extended or adjusted under 35 U.S.C. 154(b) by 0 days.

(21) Appl. No.: 11/156,137

(22) Filed: Jun. 20, 2005

(51) Int. Cl.
*B05B 9/00* (2006.01)
*B05B 7/30* (2006.01)
*B05B 1/28* (2006.01)
*F16L 55/00* (2006.01)
*F16L 21/00* (2006.01)

(52) U.S. Cl. ............ 239/379; 239/290; 239/345; 239/600; 239/DIG. 14; 285/148.27; 285/401

(58) Field of Classification Search ........... 239/379, 239/290, 345, 600, DIG. 14, 302, 340, 344, 239/350, 369, 376–378, 526; 285/148.27, 285/401, 305, 320, 328, 330, 148.22, 396
See application file for complete search history.

(56) References Cited

U.S. PATENT DOCUMENTS

| | | | | |
|---|---|---|---|---|
| 3,182,866 A | * | 5/1965 | Rowe | 222/464.1 |
| 4,405,088 A | * | 9/1983 | Gray | 239/302 |
| 5,549,228 A | * | 8/1996 | Brown | 222/570 |
| 6,595,441 B1 | * | 7/2003 | Petrie et al. | 239/345 |
| 6,877,677 B1 | * | 4/2005 | Schmon et al. | 239/346 |
| 2004/0016825 A1 | * | 1/2004 | Petrie et al. | 239/302 |
| 2004/0140373 A1 | * | 7/2004 | Joseph et al. | 239/379 |
| 2005/0156058 A1 | * | 7/2005 | Kosmyna et al. | 239/302 |

FOREIGN PATENT DOCUMENTS

WO  WO 2004/037433  * 5/2004

* cited by examiner

*Primary Examiner*—David A. Scherbel
*Assistant Examiner*—Darren Gorman

(57) ABSTRACT

A paint sprayer includes a threaded hole defined in a barrel thereof and a connection member is threadedly engaged with the threaded hole. A passage defined through the connection member and shares a common axis with the threaded hole in the sprayer. An eccentric hole is defined in a top of the connection member and an annular groove is defined in an inner periphery of the eccentric hole. An inner diameter of the annular groove is larger than an inner diameter of the eccentric hole. An insertion piece has a first end fixed to a cup and a flange eccentrically extends outward from an outer periphery of the insertion piece. A second end of the insertion piece is rotatably inserted in the connection member via the eccentric hole and the flange is rotatably engaged with the annular groove. The cup can be quickly disengaged from or connected to the sprayer by rotating the cup less than one revolution.

2 Claims, 3 Drawing Sheets

CONNECTION OF CUP AND PAINT SPRAYER

FIELD OF THE INVENTION

The present invention relates to a paint sprayer and more particularly, to a connection of the cup and the sprayer. The cup can be quickly removed from or connected to the sprayer.

BACKGROUND OF THE INVENTION

A conventional paint sprayer is disclosed in FIG. 1 and generally includes a barrel with a handle connected to the barrel and pressurized air is provided into the barrel from a lower end of the handle. A cup is threadedly connected to a top of the barrel so that when the cup is disengaged from or connected to the barrel, the user has to rotate the cup several revolutions. This takes a lot of time.

The present invention intends to provide a connection between the cup and the barrel of the sprayer wherein the cup can be disengaged from or connected to the sprayer by rotating the cup less than one revolution.

SUMMARY OF THE INVENTION

The present invention relates to a paint sprayer which comprises a threaded hole defined in a barrel of the sprayer and a connection member is threadedly engaged with the threaded hole. A passage shares a common axis with the threaded hole in the sprayer. An eccentric hole is defined in a top of the connection member and an annular groove is defined in an inner periphery of the eccentric hole. An inner diameter of the annular groove is larger than an inner diameter of the eccentric hole. An insertion piece has a first end fixed to a cup and a flange eccentrically extends outward from an outer periphery of the insertion piece. A second end of the insertion piece is rotatably inserted in the connection member via the eccentric hole. The flange is rotatably engaged with the annular groove.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
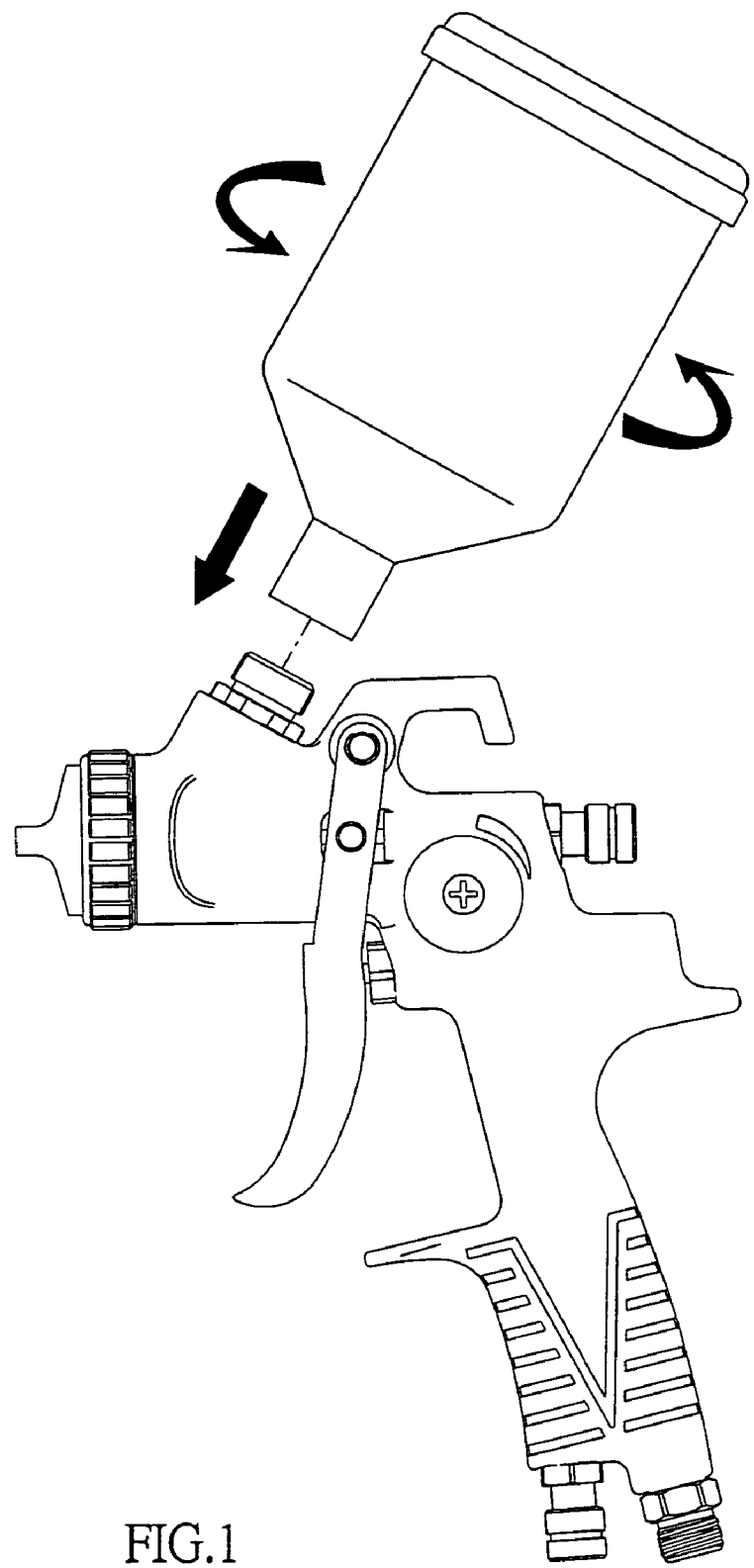
FIG. 1 is a conventional paint sprayer and a cup is threadedly connected to the sprayer.
Figure 2:
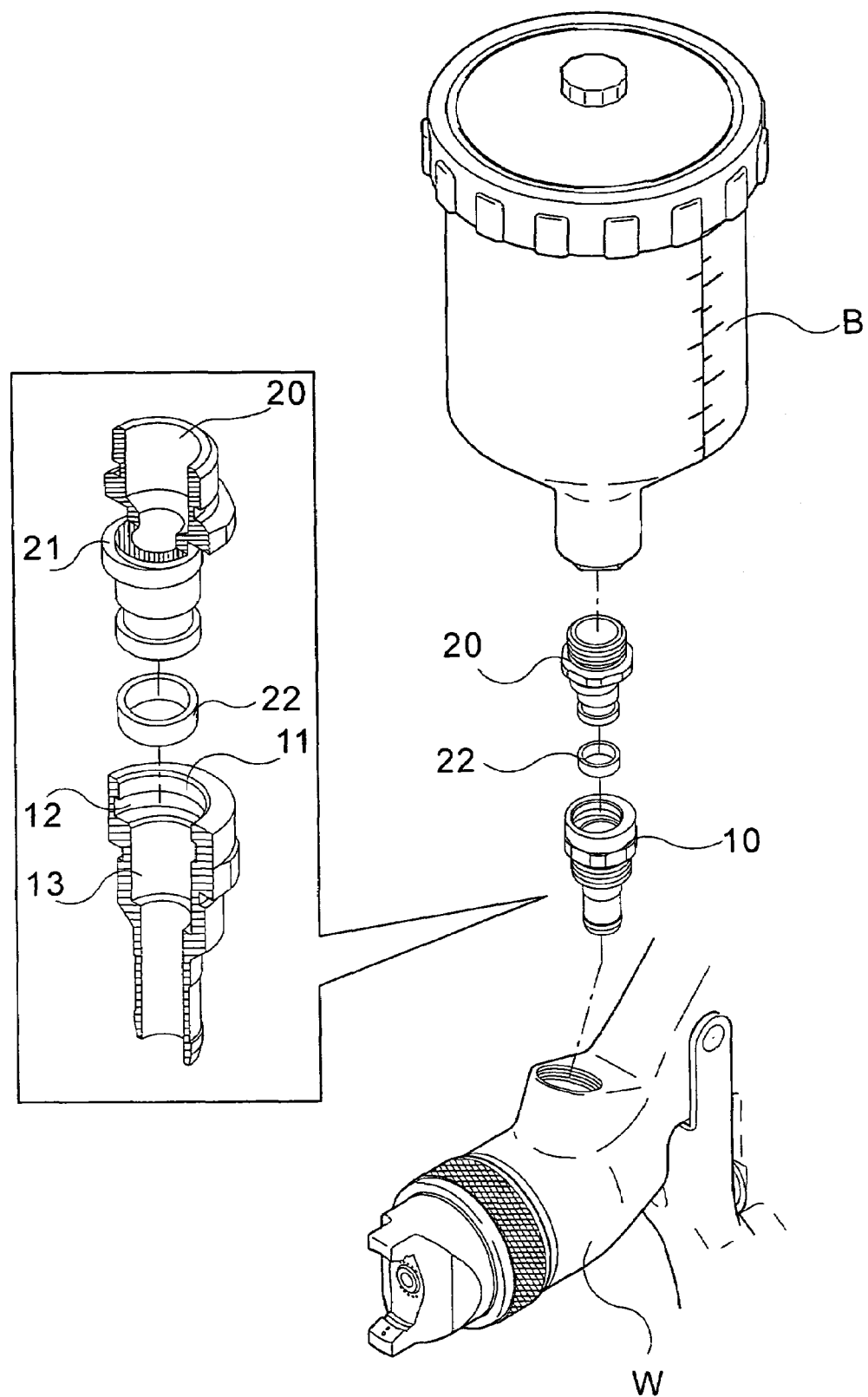
FIG. 2 is an exploded view to show the paint sprayer and the cup of the present invention.
Figure 3:
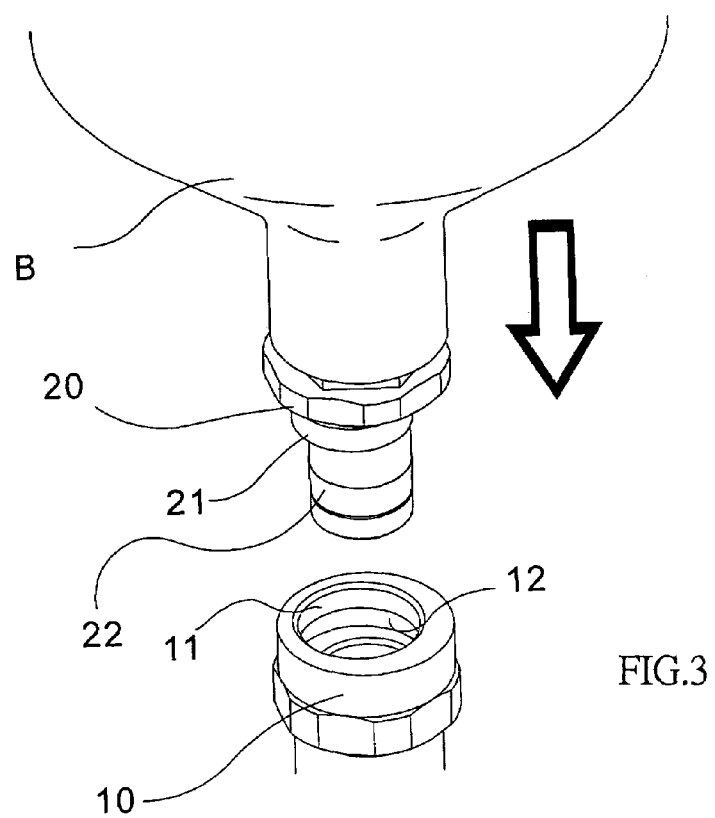
FIG. 3 shows that the second end of the insertion piece is to be inserted in the connection member on the sprayer.

Referring to FIGS. 2 to 3, the paint sprayer "W" of the present invention comprises a threaded hole defined in a barrel of the sprayer "W" and a connection member 10 is threadedly engaged with the threaded hole in the sprayer "W". The connection member 10 has a passage 13 defined therethrough and shares a common axis with the threaded hole in the sprayer "W". An eccentric hole 11 is defined in a top of the connection member 10 and an annular groove 12 is defined in an inner periphery of the eccentric hole 11. An inner diameter of the annular groove 12 is larger than an inner diameter of the eccentric hole 11.

An insertion piece 20 has a first end fixed to a cup "B" and a flange 21 eccentrically extends outward from an outer periphery of the insertion piece 20. A second end of the insertion piece 20 includes a groove with which a seal 22 is engaged. The second end of the insertion piece 20 is rotatably inserted in the connection member 10 via the eccentric hole 11 and the flange 21 is rotatably engaged with the annular groove 12.

Figures 4, 5:
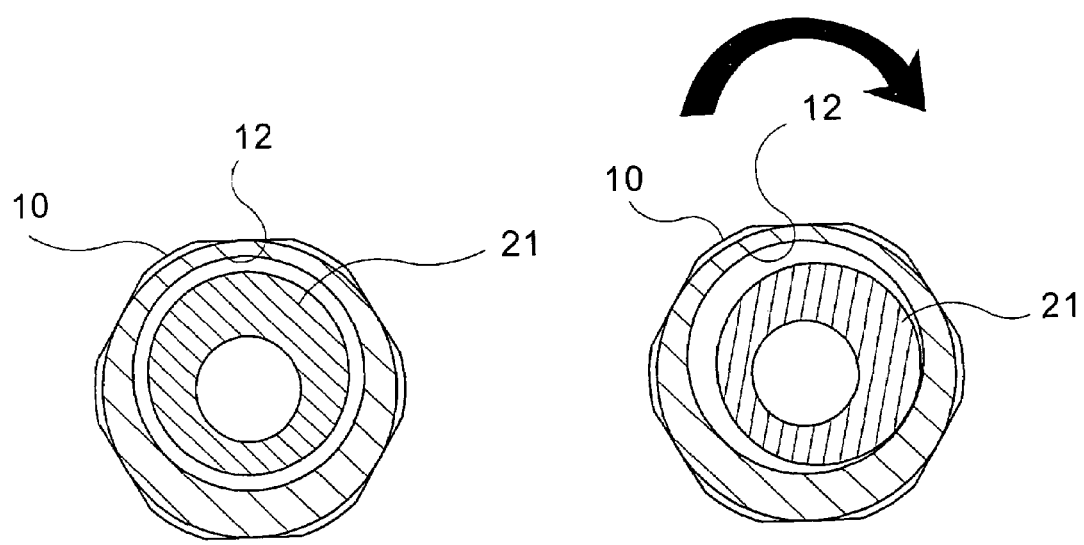
FIG. 4 is a cross sectional view to show that the flange is engaged with a first position in the annular groove.
FIG. 5 is a cross sectional view to show that the flange is engaged with a second position in the annular groove.

As shown in FIGS. 4 and 5, the eccentric flange 21 can be moved between a first position and a second position in the annular groove 12 by rotating the cup "B" less than one revolution. In other words, when the flange 21 is located at the first position, the insertion piece 20 can be removed from the connection member 10, so that the cup "B" can be quickly disengaged form the sprayer "W". When the flange 21 is located at the second position, the insertion piece 20 can not be removed from the connection member 10, so that the cup "B" is positioned to the sprayer "W".

The cup "B" is disengaged form or connected to the sprayer "W" quickly by rotating the cup "B" a limited angle.

While we have shown and described the embodiment in accordance with the present invention, it should be clear to those skilled in the art that further embodiments may be made without departing from the scope of the present invention.

What is claimed is:

1. A paint sprayer comprising:
a threaded hole defined in a barrel of the sprayer;
a connection member threadedly engaged with the threaded hole in the sprayer and a passage which shares a common axis with the threaded hole in the sprayer, an eccentric hole defined in a top of the connection member and an annular groove defined in an inner periphery of the eccentric hole, an inner diameter of the annular groove being larger than an inner diameter of the eccentric hole, and
an insertion piece having a first end fixed to a cup and a flange eccentrically extending outward from an outer periphery of the insertion piece, a second end of the insertion piece rotatably inserted in the connection member via the eccentric hole and the flange rotatably engaged with the annular groove.

2. The sprayer as claimed in claim 1, wherein a seal is mounted to the second end of the insertion piece and located within the passage in the connection member.

* * * * *